United States Patent [19]

Saltzer

[11] 4,438,520
[45] Mar. 20, 1984

[54] SYSTEM FOR REGENERATING A DATA WORD ON A COMMUNICATIONS RING

[75] Inventor: Jerome H. Saltzer, Waban, Mass.

[73] Assignee: Massachusetts Institute of Technology, Cambridge, Mass.

[21] Appl. No.: 285,800

[22] Filed: Jul. 22, 1981

[51] Int. Cl.³ .............................................. H04J 6/02
[52] U.S. Cl. ......................................... 375/4; 370/89
[58] Field of Search ............ 178/70 R, 70 T; 370/86, 370/89, 97; 328/163, 164; 375/3, 4, 102, 110, 118

[56] References Cited

U.S. PATENT DOCUMENTS 3,113,268 12/1963 Horak ..................................... 375/3
3,737,585 6/1973 Ghosh ..................................... 370/97

*Primary Examiner*—Benedict V. Safourek
*Attorney, Agent, or Firm*—Arthur A. Smith, Jr.; Sam Pasternack

[57] ABSTRACT

A system for regenerating an n-bit data word on a token mediated communications ring includes a decoder for receiving the data signal from the ring and deriving the n-bit data word and an associated clock signal from the received data signal. A re-transmit clock generator generates a transmit clock signal incorporating the $i^{th}$ through the $n^{th}$ cycles from the derived clock signal, followed by i cycles at the nominal system clock rate. A delay network delays the derived data word by a period approximately equal to the period of the nominal system clock. An encoding network regenerates the n-bit data word for re-transmission on the ring by encoding the delayed derived data word with the transmit clock signal.

5 Claims, 10 Drawing Figures

DISCARDED CLOCK CYCLE   NEWLY GENERATED CLOCK CYCLE

SYSTEM FOR REGENERATING A DATA WORD ON A COMMUNICATIONS RING

The Government has rights in this invention pursuant to Contract Number N00014-75-C-0661 awarded by the U.S. Department of the Navy.

FIELD OF THE INVENTION

The present invention is in the field of data communications, and more particularly relates to closed loop communications networks.

BACKGROUND OF THE DISCLOSURE

There are many known communications systems which use encoded data from which timing and data signals may be derived. In one form, a data communication network may consist of a ring-like signal path including one or more active repeaters and use a continuously circulating token to mediate access. For example, see the network described in Clark, Pogran and Reed, *Proc. IEEE* 66, pp. 1497-1516. In such networks, a plurality of user terminals are coupled to a ring. The ring is normally quiet (in the absence of use) while a digital "token" circulates around the ring. Upon detection of the token at his terminal, a user may "grab" the token and thereby gain access to the entire bandwidth of the ring. The user then transmits a message followed by re-insertion of a token onto the ring. Any other user may then gain access to the ring when he detects the token at his terminal.

In practice, the token may recirculate many times before a user may desire access to the ring. However, as the token recirculates, low level noise adds to that signal. The resultant token-plus-noise appears to a detector (for example, at a user terminal) as a digital signal with phase jitter, i.e. the transitions between digital states appear delayed or advanced in time from their nominal positions. Particularly for relatively short tokens it is necessary to correct for the corrupting influence of this random noise on the timing of the pules that constitute the digital signals. To this end, rings in such a digital communication networks include active repeaters for restoring the digital signal on the ring to nominally correct timing.

For a token-mediated ring, there are two modes of operation, originating a message and circulating a token. When originating a message, one user terminal breaks the ring (after capturing the token), transmits its message into the ring followed by the token, and awaits return of the message on the receive side, and then drains the message from the ring. In this mode, each transmitted bit is repeated once by each station of the ring, and one can calculate the expected accumulation of timing noise as the bits progress around the ring. The designer can then choose parameters of signal levels so as to assure that every station will be able to receive the message with high probability. Thus, in this mode, since the message only goes around the ring once and the phase jitter may be accommodated, no timing restoration need be done by the repeaters.

When circulating a token, however, the token bit pattern, once introduced to the ring, circulates around and around the ring until such time as some user terminal decides to originate a message; the token bit pattern may go through many millions of cycles of detection and retransmission. In this case, no choice of signal-to-noise ratio can prevent the token timing from eventually being degraded to unrecognizability, and some timing restoration measure is necessary.

In the prior art, timing regeneration may be accomplished by introducing new, corrected timing on every repeated bit. In that scheme, every repeater has its own independent clock that is used for transmission of the repeated signal. As successive repeaters will have clocks that operate at slightly different frequencies, it is necessary to introduce occasional time wedges in some bits to maintain approximate phase match between the received and the regenerated signal. That system uses a timing clock that is some multiple of the data transmission rate (e.g. six times) and the speed of the circuitry using that clock limits the maximum frequency of transmission. In addition, the cumulative effect of timing wedges applied to a continuously circulating token must be somehow controlled.

A second alternative approach requires the synchronization of the clocks of the ring of repeaters, using a phase-locked-loop and voltage-controlled oscillator for the timing clock at each repeater. This approach requires continuous transmission of timing bits to maintain loop lock which in turn requires a closed loop circulation delay of an integral number of bit times. It also requires careful analysis and design to assure stability of the ring of phase-locked-loops and phase-delay compensators. The analog circuitry required to obtain frequency lock and correct phase delay is relatively complex, and is generally concentrated in a special station, as is done for example in The Cambridge University ring (Wilkes and Wheeler, *Proc. Local Area Comm. Network Symp.*, pp. 47-60.) and the Century Data Bus (Okuda, Kunikyo, and Kaji, *Proc. Fourth Int. Conf. on Computer Comm.*, pp. 161-166).

It is an object of the present invention to provide a ring communications network having improved data regeneration.

SUMMARY OF THE INVENTION

Briefly, the present invention is a system for regenerating a n-bit data word on a communications ring signal path, where that system has a nominal system clock rate. The system of the invention is adapted for use in an active repeater (which may be coupled to the ring at a terminal, or may be coupled separately to the ring). In various forms of the invention, data on the ring may be baseband, or modulated carrier, for example.

The system includes an input coupled to the ring for receiving a data word, such as a token, propagating on the ring, where the word may be in a conventional format. A decoder is responsive to the received data word to derive an n-cycle derived clock signal and an n-bit derived data word.

A delay network generates a local data word corresponding to the derived data word but delayed by i periods, where each period is approximately equal to the period associated with the nominal system clock rate. In various forms of the invention, the duration of the i periods may equal the period associated with the nominal system clock rate plus or minus tolerance values b or a, respectively, where a and b are values related to the system noise value. By way of example, the periods may equal the period of the first clock cycle of the derived clock signal, or may equal just the period associated with the nominal system clock rate.

A re-transmit clock generator generates an n-cycle transmit clock signal which includes $n-i$ cycles at the same rate as the $(i+1)^{th}$ through the $n^{th}$ cycles of the derived clock signal followed by i cycles at the system clock rate. Thus, the transmit clock signal is a train of clock pulses, the first group of which are identical to the corresponding cycles in the derived clock signal and the last group of which are "correctly" timed at the nominal system clock rate. An encoder generates an n-bit transmit data word by encoding the local data word, clocking that encoded data with the transmit clock signal. The resultant transmit data word corresponds to the re-clocked, or regenerated, n-bit data word.

In one form of the invention, the transmit clock signal includes cycles corresponding to the derived clock signal in all but the last cycle, which is at the nominal system clock rate. Using this configuration, the re-clocked data is generated using input derived clocks (and thus noisy clock cycles for all but the last bit of the token), and a new correctly timed clock signal is used for the last bit. In the next repeater, this last correctly timed pulse is used with one repeater's noise added to transmit the next-to-last token bit. After passing through the number of repeaters required to replace each of the timing bits, the first corrected timing pulse will be eliminated and the next repeater will generate a replacement. Thus, for example, in a system utilizing a five-bit token, any given timing pulse will accumulate the noise of no more than four repetitions before it is discarded. As long as the noise level is low enough to allow digital data to be reliably detected after five repetitions, the present invention will allow a token to be repeated indefinitely without accumulating substantial noise.

BRIEF DESCRIPTION OF THE DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENT

Figure 1:
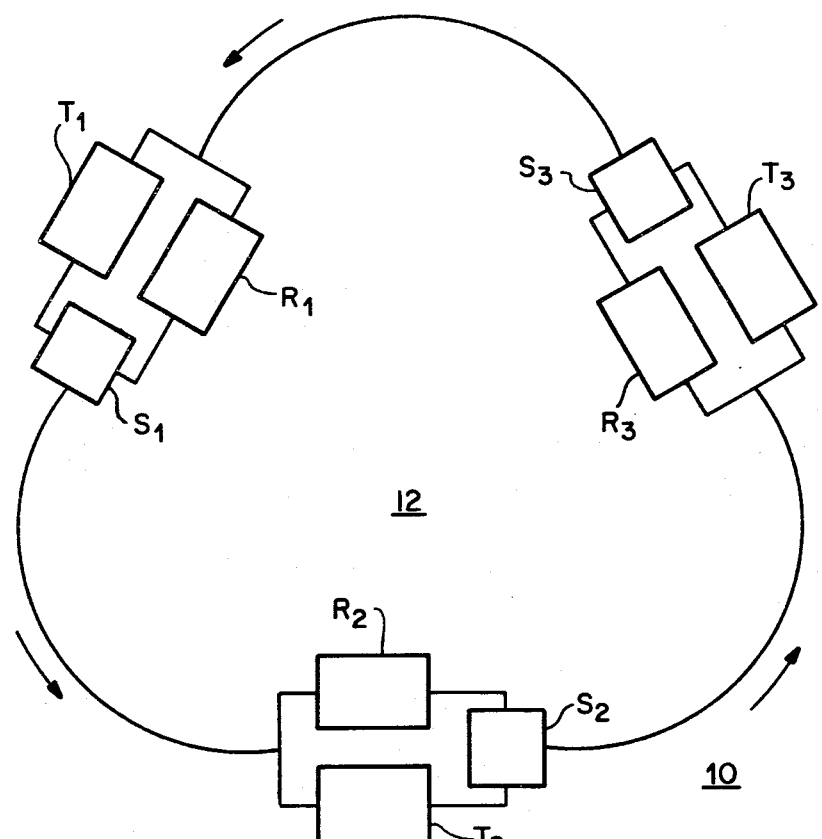
FIG. 1 shows in block diagram form, an exemplary system embodying the present invention.

FIG. 1 shows a communications system 10 including an embodiment of the present invention. The system 10 includes a "ring" unidirectional signal path (or ring) 12. A plurality of parallel terminal and repeater pairs (exemplified by repeaters $R_1$, $R_2$ and $R_3$ and terminals $T_1$, $T_2$ and $T_3$) and associated switches (exemplified by switches $S_1$, $S_2$, and $S_3$) are coupled along that ring signal path. The ring 12 may be formed, for example, with twisted wire pairs for a baseband system or a conventional r.f. cable configuration for a modulated r.f. system, or optical fibers for an optical system. Each of the terminals and repeaters includes an input port for receiving a signal from the ring. Each of switches $S_1$, $S_2$ and $S_3$ includes an output port for transmitting a signal (either from a terminal or a repeater) onto the ring. In alternate embodiments, there may be one or more repeaters present without associated terminals.

In the present embodiment, each of the terminals $T_1$, $T_2$ and $T_3$ may be controlled to transmit a digital token signal, or token, from the ring 12. The token is in the form of a self-timed code, for example, a biphase code in which every pulse is a standard nominal width (m nanoseconds) for each half of the biphase signal.

In operation, initially the token is transmitted onto the ring 12. While no terminals are transmitting on the ring, the switches are controlled so that the repeaters sequentially receive and re-transmit the token as it continuously propagates around the ring. Each of terminals $T_1$, $T_2$ and $T_3$ may be requested by externally connected devices (not shown) to gain access to the ring 12 and transmit a digital message addressed (or not) to any, some, or all of the other terminals coupled to the ring 12.

Upon such a request to a terminal (such as $T_1$) that terminal monitors the ring 12 to detect the receipt of the token from the ring. When the token is received by T1, $T_1$ first controls switch $S_1$ to prevent immediate re-transmission of the token received by repeater $R_1$ on the ring and then transmits (by way of switch $S_1$) its message followed by a new token. This message, followed by the token, propagates around the ring by way of the repeaters. Since no other terminal can transmit a message until it receives the token, the message transmitted by termials $T_1$ is assured of reaching the desired terminal without being garbled by another transmission. When the transmitted message returns to terminal $T_1$, terminal $T_1$ removes the message from the ring, leaving just the token on the ring.

In order to maintain the integrity of the token as it propagates around the ring, one or more of the repeaters (as many as necessary, depending in part upon the length of the propagation path around the ring) include a timing regenerator network adapted to derive a timing signal from a received token, which timing signal is used to re-transmit the received token on the ring.

Figure 2:
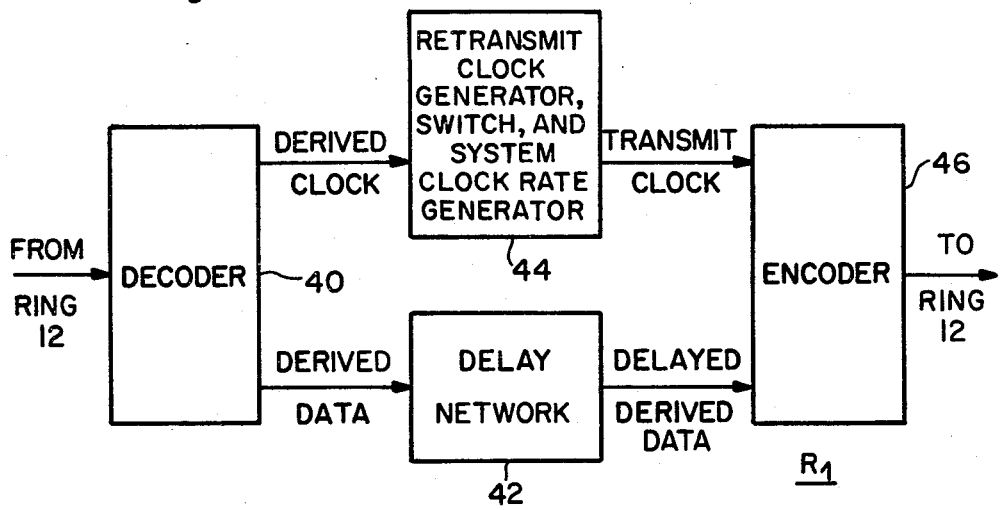
FIG. 2 shows in detailed block diagram form a repeater of the system of FIG. 1.

FIG. 2 shows the preferred form for the repeater $R_1$. That repeater includes a decoder 40, delay network 42, re-transmit clock generator 44 and encoder 46.

Figure 3:
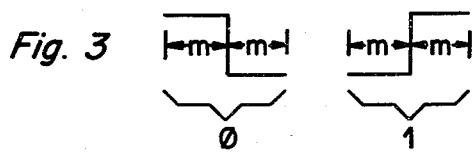
FIGS. 3-10 are waveforms illustrative of the operation of the repeater of FIG. 2.
Figure 4:
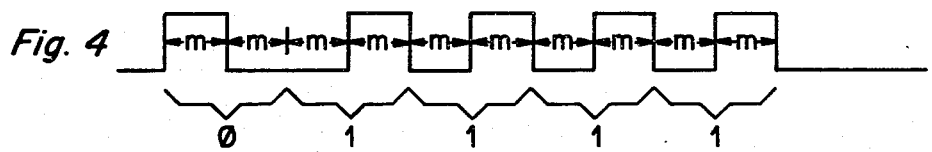

FIGS. 3-10 show waveforms which are illustrative of the operation of the repeater of FIG. 2 using the biphase code of FIG. 3 for the exemplary five bit token 01111. In operation, the encoded token is initially transmitted onto the ring in the form shown in FIG. 4. As that token propagates around the ring, it is degraded until, for this example, it is received at repeater $R_1$ in the form shown in FIG. 5, where the nominal (in the absence of noise) 0-1 and 1-0 transition points are indicated by the broken vertical lines.

Figure 5:
Figure 6:
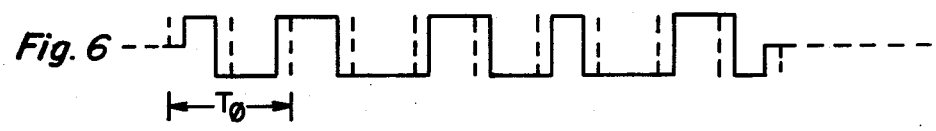
Figure 7:

FIGS. 6 and 7 show the clock signal and data signals, respectively, which are conventionally derived by the decoder 40 from the received token shown in FIG. 5. For illustrative purposes, those clock and data signals are shown as three-level. In practice, those signals might be two-level with a third line being used to indicate signal presence.

To regenerate the data for re-transmission, network 42 delays the derived data by a period approximately equal to the duration of the period associated with the nominal system clock (i.e. $T_o$, as shown in FIG. 6). In various embodiments, the precise delay may differ from $T_o$ (by as much as $T_o/4$, for example) depending on the noise level of the system.

Figure 8:
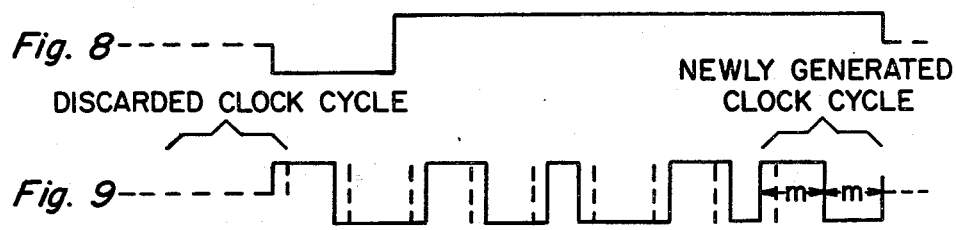
Figure 9:

FIG. 8 shows the delayed derived data signal for the present example. Network 44 includes a switch coupled to the derived clock signal and a local oscillator (at the nominal system clock rate). The switch is driven to generate a re-transmit clock signal (shown in FIG. 9) from the derived clock by dropping the first clock cycle in that signal and utilizing the remaining four cycles followed by an added cycle having two m nanosecond duration portions. Thus, the last cycle of the transmit clock is precisely maintained at the system nominal clock rate.

Figure 10:

Encoder 46 then clocks the delayed derived data (as shown in FIG. 8) with the transmit clock signal to generate the re-clocked transmit data, as shown in FIG. 10, for transmission onto the ring.

With this configuration, the token is repeated using input-derived, and thus noisy clock cycles for the first four bits of the token and a new, correctly timed clock cycle for the last bit. In the next repeater, this last, correctly timed pulse is used, with one repeater's noise added, to transmit the next-to-last token bit. After passing through four such repeaters, this timing pulse is used to transmit the first bit of the token, and then the next repeater will discard it. Any given timing pulse will thus accumulate the noise of no more than four repetitions before it is discarded.

As long as the noise level is low enough to allow digital data to be reliably detected after five repetitions, this system permits a token to be repeated indefinitely without accumulating noise. The principle is extrapolatable to any token length and bit pattern.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A system for regenerating a n-bit data word on a communications ring signal path, said system having a nominal system clock rate, comprising:

A. means for receiving said n-bit data word and generating an n-cycle derived clock signal and an n-bit derived data word from said received data word,
   B. means for generating a local data word from said derived data word, said local data word corresponding to said derived data word delayed by i periods, each of said periods being approximately equal to the period associated with the nominal system clock rate,
   C. means for generating an n-cycle transmit clock signal from said derived clock signal, said transmit clock signal including $n-i$ cycles at the same rate as the $(i+1)^{th}$ through the $n^{th}$ cycles of said derived clock signal followed by i cycles at said system clock rate, where i is greater than or equal to one, and less than or equal to $n-1$,
   D. means for generating an n-bit transmit data word from said transmit clock signal and said local data word, each bit corresponding in time to a correspondingly positioned cycle of said transmit clock signal and having a bit value corresponding to the correspondingly positioned bit value of said local data word, wherein said transmit data word is said reclocked n-bit data word.

2. A system according to claim 1 wherein each of said i periods is substantially equal to the period of the first clock cycle of said derived clock signal.

3. A system according to claim 1 wherein each of said i periods is substantially equal to the period associated with said nominal system clock rate.

4. A system according to claim 1 wherein each of said i periods is substantially equal to T where $(T_o+a)<T<(T_o+b)$, where $T_o$ is the period associated with said nominal system clock rate and a and b are values related to the system noise level.

5. A system according to claims 1 or 2 or 3 or 4 wherein $i=1$.

* * * * *